United States Patent [19]

Barrett

[11] 4,035,643

[45] *July 12, 1977

[54] INFRARED GAS ANALYSIS

[75] Inventor: Joseph J. Barrett, Morris Plains, N.J.

[73] Assignee: Allied Chemical Corporation, Morris Township, N.J.

[*] Notice: The portion of the term of this patent subsequent to Feb. 17, 1993, has been disclaimed.

[21] Appl. No.: 647,388

[22] Filed: Jan. 8, 1976

Related U.S. Application Data

[63] Continuation-in-part of Ser. No. 478,543, June 11, 1974, Pat. No. 3,939,348.

[51] Int. Cl.² .......................................... G01J 3/28
[52] U.S. Cl. .............................. 250/339; 250/340; 250/343; 356/106 S
[58] Field of Search .................. 250/339, 340, 343; 356/106 S

[56] References Cited

U.S. PATENT DOCUMENTS

| | | | |
|---|---|---|---|
| 3,853,404 | 12/1974 | Barrett | 356/106 S |
| 3,939,348 | 2/1976 | Barrett | 250/343 |

Primary Examiner—Alfred E. Smith
Assistant Examiner—B. C. Anderson
Attorney, Agent, or Firm—Ernest D. Buff

[57] ABSTRACT

A method and apparatus for detecting and quantitatively measuring a molecular species of gaseous material in a sample to be analyzed are provided. Light containing incoherent infrared radiation is collected, collimated and transmitted by a light conditioning means to a primary filtering means. The primary filtering means selectively transmits light having a frequency range in the region of an absorption band for a molecular species to be detected. A secondary filtering means, adapted to receive the filtered light, transmits light at a plurality of discrete frequencies, providing a detectable signal, through the gaseous material. The intensity of the signal changes in proportion to the concentration of the molecular species. Means are provided for measuring and recording the magnitude of the signal intensity change. The intensity of the detectable signal is not affected by molecular species other than the species appointed for detection, and the intensity differential represents a relatively large change in a small signal. Hence, gaseous constituents are detected in an accurate and economical manner.

20 Claims, 5 Drawing Figures

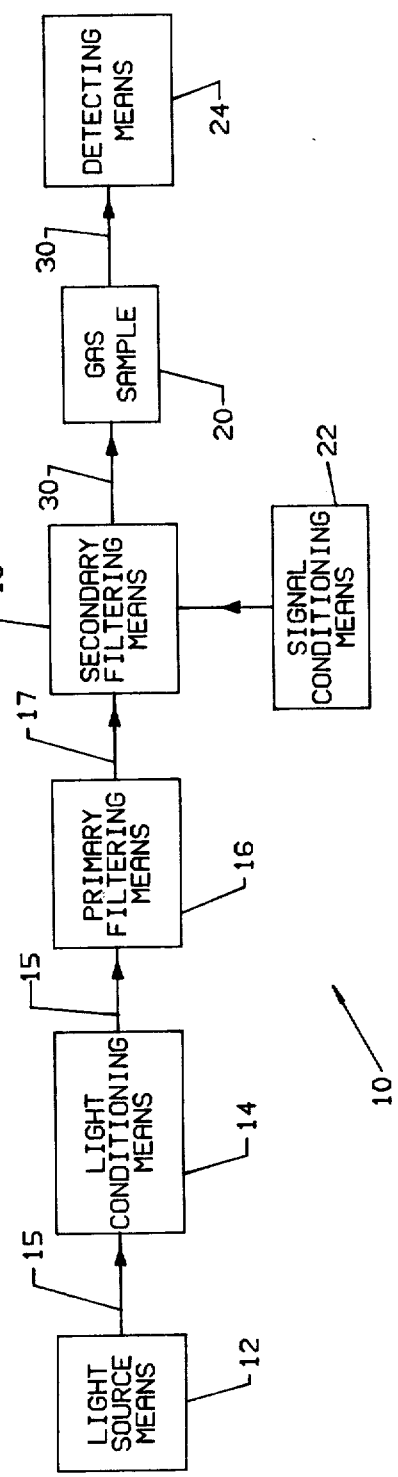
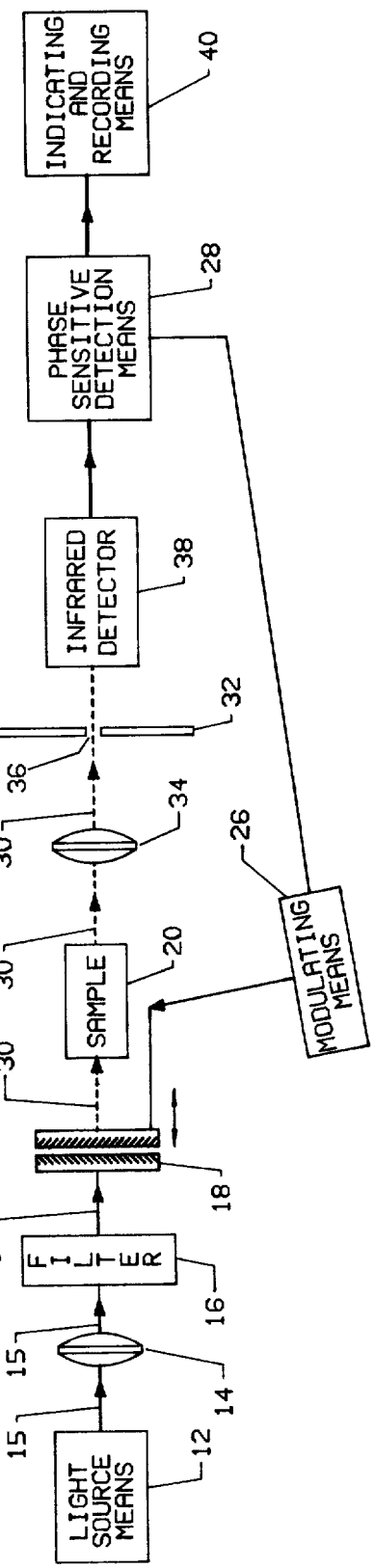

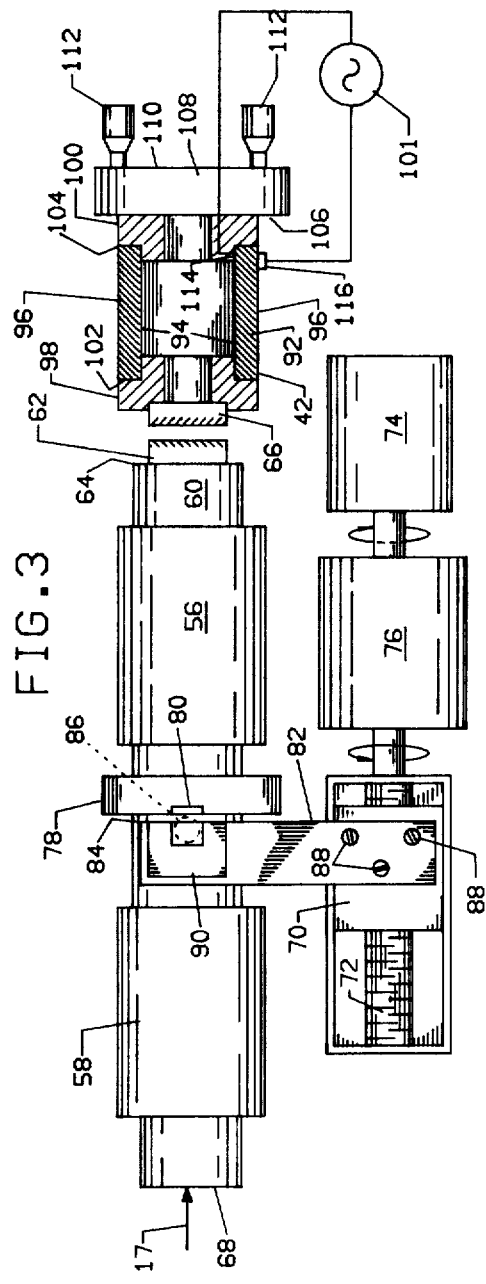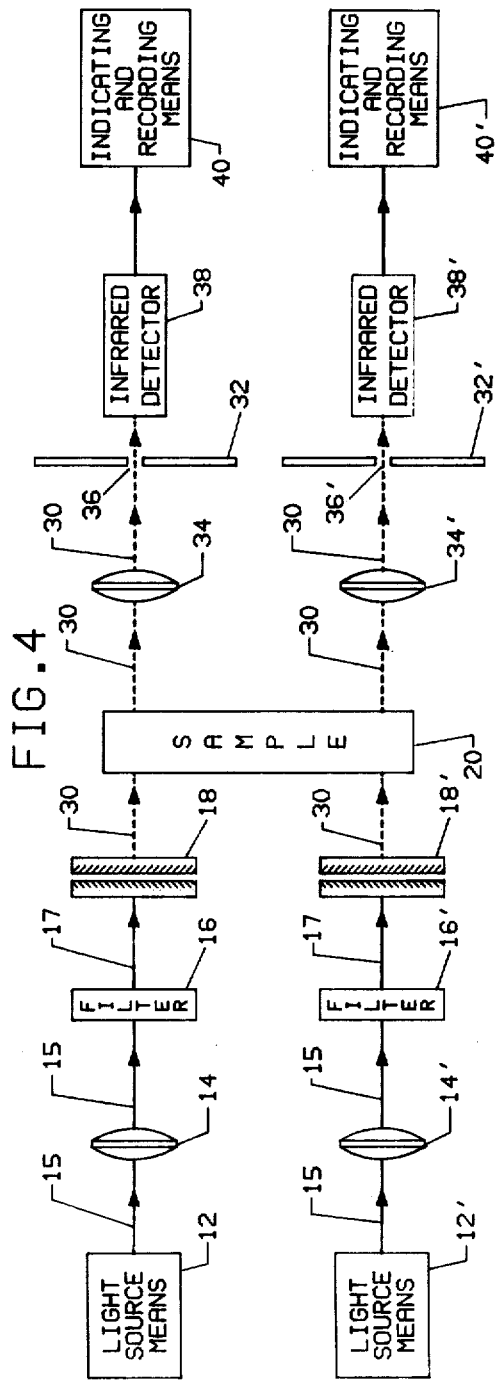

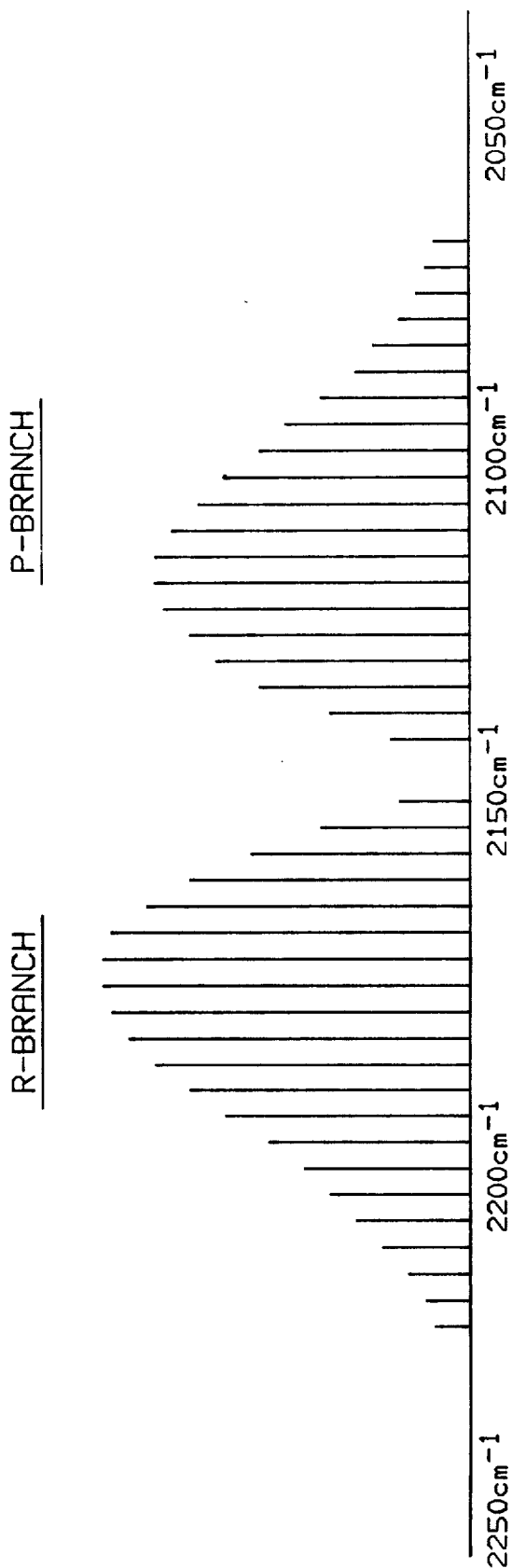

INFRARED GAS ANALYSIS

This is a continuation-in-part application of my copending application Ser. No. 478,543 filed June 11, 1974, now U.S. Pat. No. 3,939,348.

BACKGROUND OF THE INVENTION

This invention relates to the field of infrared gas analysis and more particularly to a method and apparatus in which light is transmitted through a gas sample at discrete frequencies correlated with the absorption spectrum of a gaseous constituent thereof to detect and quantitatively measure the constituent.

DESCRIPTION OF THE PRIOR ART

In the apparatus conventionally used for non-dispersive infrared gas analysis, a beam of infrared radiation having an emission spectrum embracing the absorption spectrum of the gas to be analyzed through a gas sample to a transducer. The output signal from the transducer is compared with that produced by passing the beam through the series combination of the sample and a reference gas of the type appointed for analysis. A signal intensity differential, produced by absorption in the sample, is converted to a detectable signal and displayed.

One of the major problems with such analyzers is the difficulty of analyzing quantities of gaseous constituents present in the low parts per million range. The signal intensity differential represents a relatively small change in a large signal and is frequently obscured by spectral interference between absorption spectra of the constituent being analyzed and absorption spectra of coexistent constituents. Another problem with such analyzers is the decreased sensitivity which results unless the temperature and pressure of the reference gas are carefully controlled. To alleviate these problems, it has been necessary to provide the analyzers with highly sensitive forms and combinations of detectors, sources, filters, control systems and the like, which are relatively expensive. For the above reasons, gas analyzers of the type described have low sensitivity and high operating costs.

SUMMARY OF THE INVENTION

The present invention provides apparatus wherein light from the infrared frequency region is transmitted through a sample of gaseous material at discrete frequencies correlated with the absorption spectrum of a molecular species thereof to detect and quantitatively measure the species. Briefly stated, the apparatus has light source means for generating incoherent infrared radiation. A light conditioning means collects, collimates and transmits the light to a primary filtering means. The primary filtering means is adapted to receive the light and selectively transmit light having a frequency range in the region of an absorption band for the molecular species to be detected. A secondary filtering means, adapted to receive the filtered light, transmits light at a plurality of discrete frequencies forming a plurality of fringes which provide a detectable signal. The secondary filtering means has interference producing means for providing a plurality of transmission windows regularly spaced in frequency. The frequency spacing between adjacent windows is adjusted to equal substantially the product of the frequency difference between adjacent spectral lines of the absorption spectrum for the molecular species to be detected and the factor $(n/n')$, where $n$ and $n'$ are integers and $n$ does not equal $n'$. Under these circumstances, the interference producing means forms a comb filter. The secondary filtering means also has scanning means for causing the transmission peaks for adjacent $n$'th orders to coincide substantially with the spectral lines of such absorption spectrum. Means are provided for transmitting the detectable signal through the gaseous material, thereby the intensity of the detectable signal changes in proportion to the concentration of the molecular species. The intensity change of the detectable signal is converted to a measurable form by a signal conditioning means, and the magnitude thereof is indicated by detecting means.

Further, the invention provides a method for detecting and quantitatively measuring a molecular species of gaseous material in a sample to be analyzed, comprising the steps of generating light in the form of incoherent infrared radiation; collecting, collimating and transmitting the light; filtering said light so as to selectively transmit light having a frequency range in the region of an absorption band for the molecular species to be detected; interferometrically filtering said filtered light and transmitting light at a plurality of discrete frequencies to form a plurality of fringes which provide a detectable signal by directing the light through a plurality of transmission windows regularly spaced in frequency, the frequency spacing between adjacent windows being equal substantially to the product of the frequency difference between adjacent spectral lines of the absorption spectrum for the molecular species to be detected and the factor $n/n'$, where $n$ and $n'$ are integers and $n$ does not equal $n'$, and scanning said light to cause the transmission peaks for adjacent $n'$th orders to coincide substantially with the spectral lines of said absorption spectrum, said detectable signal having an intensity substantially equal to the sum of said fringes; transmitting the detectable signal through said gaseous material, whereby the intensity of the detectable signal changes in proportion to the concentration of the molecular species; and detecting and indicating the intensity change of the signal.

Several known filtering means may be adapted for use with the above apparatus. Preferably, the secondary filtering means is a Fabry-Perot interferometer (FPI) having a mirror separation, $d$, adjusted to transmit the filtered light at a plurality of discrete frequencies correlated with the absorption spectrum of a molecular species of the gaseous material. This condition is obtained when $$d = (n'/4\mu Bn)$$

where $d$ is the mirror separation of the FPI, $\mu$ is the index of refraction of the medium between the mirrors. B is the molecular rotational constant of the species $n$ and $n'$ are integers and $n$, does not equal $n'$. For a given molecular species, the rotational constant $B$ is a unique quantity. Thus, identification of the species having a particular absorption spectrum is made positively by adjusting the mirror separation of the FPI such that the discrete frequencies transmitted coincide substantially with the absorption lines of the molecular species to be detected. Advantageously, the intensity of the detectable signal is not affected by molecular species other than the species appointed for detection and the intensity differential represents a relatively large change in a small signal. Spectral interference is minimized and no reference gas is needed. The sensitivity of the apparatus is increased and highly sensitive forms and combinations of detectors, sources, filters and control systems are unnecessary. As a result, the method and apparatus of this invention permits gaseous constituents to be detected more accurately and at less expense than systems wherein the emission spectrum of light passed through the sample contains a continuum of frequencies.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 1 is a block diagram showing apparatus for detecting and quantitatively measuring a molecular species of gaseous material;

FIG. 2 is a schematic diagram of the apparatus of FIG. 1;

FIG. 3 is a side view, partially cut away, showing means for modulating the secondary filtering means of FIGS. 1 and 2;

FIG. 4 is a schematic diagram showing an alternate embodiment of the apparatus of FIG. 1; and FIG. 5 illustrates the absorption spectrum of a particular molecular species.

DESCRIPTION OF THE PREFERRED EMBODIMENTS

Referring to FIG. 1 of the drawings, there is shown preferred apparatus for detecting and quantitatively measuring a molecular species of gaseous material. The apparatus, shown generally at 10, has light source means 12 for generating light 15 containing incoherent infrared radiation. A light conditioning means 14 collects, collimates and transmits the light 15 to a primary filtering means 16. The primary filtering means 16 is adapted to receive the light 15 and selectively transmit light 17 having a frequency range in the region of an absorption band for the molecular species to be detected. A secondary filtering means 18, adapted to receive the filtered light 17, transmits light at a plurality of discrete frequencies forming a plurality of fringes which provide a detectable signal 30. The detectable signal 30 is transmitted through gaseous material in sample 20. A signal conditioning means 22 converts to measurable form intensity changes created in the signal 30 by said molecular species of the sample 20. The magnitude of the intensity change is indicated by detecting means 24.

More specifically, as shown in FIG. 2, the primary filtering means 16 is a narrow band pass filter composed of multiple layers of dielectric thin films, and the secondary filtering means 18 has interference producing means for providing a plurality of transmission windows regularly spaced in frequency. In addition, the secondary filtering means 18 has scanning means for variably controlling the frequency of each order. The interference producing means is adjusted so that the frequency spacing between adjacent windows equals substantially the product of the frequency difference between adjacent spectral lines of the absorption spectrum for the molecular species to be detected and the factor ($n/n'$, where $n$ and $n'$ are integers and $n$ does not equal $n'$. Under these circumstances, the detectable signal 30 transmitted by the secondary filtering means 18 has an intensity substantially equal to the sum of the fringes. Moreover, the intensity of the signal 30 is not affected by molecular species other than the species appointed for detection, referred to hereinafter as the preselected species.

Upon transmission of the detectable signal 30 through gaseous material in sample 20, its intensity changes in proportion to the concentration of the preselected species. Such intensity change is converted to measurable form by the signal conditioning means 22. The latter has modulating means 26 for modulating the phase difference between interfering rays of light transmitted by the secondary filtering means 18 so as to shift the frequency of each fringe transmitted thereby. Signal conditioning means 22 also has synchronous (e.g., phase sensitive) detecting means 28 for detecting the intensity variation of the signal 30, whereby the magnitude of the intensity change can be identified by detecting means 24.

Several known filtering means may be used as the secondary filtering means with the apparatus 10. Preferably, the secondary filtering means is a Fabry-Perot interferometer having a mirror separation, $d$, adjusted to transmit filtered light from the primary filtering means 16 at a plurality of discrete frequencies correlated with the absorption spectrum of the preselected species. The transmission function of an FPI ($I_t$) can be given by the Airy formula: $I_t = T^2[1+R^2-2\cos\phi]^{-1} \cdot I_o$ where $T + R + A = 1$, $I_o$ is the intensity of the incident light, and the phase difference $\phi$ is expressed as $\phi = 4\pi\mu\omega d$ for rays normal to the FPI mirrors. The symbols $A$, $R$ and $T$ represent, respectively, the absorbance, reflectance and transmittance of the FPI mirrors, $\mu$ is the refractive index of the medium between the FPI mirrors, $d$ is the FPI mirror separation, and $\omega$ is the frequency of the incident light expressed in wavenumbers. When $\cos\phi$ is equal to unity, transmission maxima for $I_t$ occur. Hence, $\phi = 2\pi m$, where $m$ takes on integral values and represents the order of interference. The transmission maxima for $I_t$ are referred to in the specification and claims as transmission windows. For a specific value of the mirror separation, $d$, the FPI provides a plurality of transmission windows regularly spaced in frequency. The frequency spacing, $\Delta f$, between adjacent windows (or spectral range) of the FPI is $\Delta f = (2\mu d)^{-1}$. For a simple diatomic molecule such as carbon monoxide, the frequency spacing between adjacent absorption lines of the infrared rotation-vibration absorption spectrum is approximately equal to $2B$. By varying the mirror spacing, $d$, of the FPI, $\Delta f$ can be adjusted to substantially equal the frequency difference between adjacent spectral lines of part or all of the absorption spectrum for the preselected species. That is, continuous scanning of the FPI in the vicinity of $$d \simeq 1/4\mu B$$

produces an absorption interferogram having a plurality of fringes corresponding to a superposition of substantially all the absorption lines of the preselected species. When $\Delta f=2B$, the transmission peaks for adjacent orders coincide substantially with the adjacent spectral lines of said absorption spectrum so as to produce a 1-to-1 correspondence therewith, and the amplitude of the signal from gas sample 20 is a minimum. For values of $\Delta f$ slightly different from $2B$, the transmission peaks for adjacent orders will not perfectly coincide with the absorption lines and the amplitude of the signal from gas sample 20 will increase.

Other absorption interferograms are produced for values of the interferometer mirror separation.

$$d = n'/4\mu Bn)$$

where $n$ and $n'$ are integers and $n$ does not equal $n'$. These absorption interferograms are produced when $\Delta f$ is equal to certain multiples of the rotational constant, B. The principal interferograms are produced when every absorption line coincides with a different transmission window of the FPI. Such principal interferograms are obtained for values of interferometer mirror separation $$d = n'/4\mu Bn$$

where $n$ is equal to 1 and $n'$ is an integer greater than 1. More specifically, for values of interferometer mirror separation $d = n'/(4\mu B)$ where $n'$ is an integer greater than 1, the principal interferograms are obtained. For example, with $n'=3$, radiation is transmitted by the interferometer not only at frequencies corresponding with those of adjacent absorption lines of the molecular species to be detected but also at two discrete frequencies located between each pair of the absorption lines. Secondary interferograms are obtained when every other absorption line or every thid absorption line (and so on) coincides with the transmission peaks of the FPI. Such secondary interferograms are obtained for values of the interferometer mirror separation $$d = n'/4\mu Bn$$

where $n$ is an integer greater than 1 and $n'$ is equal to 1. More specifically, for values of interferometer mirror separation $d=(1/4\mu Bn)$ where $n$ is an integer greater than 1, the secondary interferograms are obtained. For example, with $n=3$, radiation is transmitted by the interferometer at frequencies corresponding with those of every third absorption line of the molecular species to be detected.

Use of the apparatus 10 for infrared gas analysis may be exemplified in connected with the detection of a diatomic molecule such as carbon monoxide. Carbon monoxide (CO) has a vibration-rotation absorption band in the wavelength region of about 4.5 – 4.9$\mu$ with its band center at about 4.66$\mu$. This absorption band corresponds to transitions from the ground vibrational state ($v = 0$) to the first vibrational state ($v = 1$). As shown in FIG. 5, the absorption band consists of two branches: an "R-branch" corresponding to rotation-vibration transitions for which the rotational quantum number $J$ changes by +1 and a "P-branch" corresponding to rotation-vibration transitions for which the rotational quantum number $J$ changes by −1. The frequencies, in units of wavenumbers, of the rotational transitions for the R an P branches are given by the formulas $$\omega_R = \omega_0 + 2B_1 + (3B_1-B_0)J + (B_1-B_0)J^2$$

with $J = 0, 1, 2, \ldots$ $$\omega_P = \omega_0 - (B_1+B_0)J + (B_1-B_0)J^2$$

with $J = 1, 2, 3, \ldots$

The quantities $\omega_0$, $B_0$ and $B_1$ represent the absorption band center frequency, the ground state rotational constant and the first vibrational state rotational constant, respectively. The rotational constants $B_0$ and $B_1$ are related according to the equation $$B_0 = B_1 + \alpha_e$$

where $\alpha_e$ is the rotation-vibration interaction constant. Values for the rotational constants of carbon monoxide listed in American Institute of Physics Handbook, Third Edition, p. 7-173, are:

$B_0 = 1.9225145 \text{cm}^{-1}$
$B_1 = 1.9050015 \text{cm}^{-1}$
$\alpha_e + 0.017513 \text{cm}^{-1}$ The intensity distribution for the R an P branches is given by the equation $$I_{abs} = \frac{2C_{abs}\omega}{Q_R} S_J \exp\left[-B_e J(J+1)\frac{hc}{kT}\right]$$

Where $C_{abs}$ is a constant factor, $Q_R$ is the rotational partition function ($=kT/hcB$), $\omega$ is the frequency, in wavenumbers, of the individual rotation-vibration absorption lines, $h$ is Planck's constant, $c$ is the speed of light, $k$ is the Boltzmann constant, $T$ is the absolute temperature and the line strengths $S_J$ are:

$S_J = J + 1$ for the R-branch
$S_J = J$ for the P-branch

Using these equations for line positions and intensities, a schematic representation of the CO absorption spectrum shown in FIG. 5, was constructed. The representation is termed schematic as, in reality, each rotational absorption line of the spectrum has a small but finite width.

In order to utilize a Fabry-Perot interferometer to provide discrete frequencies of light at the frequencies of the absorption lines of the band, it is necessary to determine the effect of the non-periodic spacing of the rotational absorption lines on the operation of the apparatus 10. For this purpose the Fabry-Perot interferometer is adjusted such that the $J = 6$ and $J = 7$ R-branch rotational absorption lines coincide exactly with two adjacent discrete frequencies from the Fabry-Perot interferometer. These two rotational absorption lines are the strongest lines in the band. Their frequencies are:

$\omega_R(J=6) = 2169.169975 \text{cm}^{-1}$ $\omega_R(J=7) = 2172.734796 \text{cm}^{-1}$ The wavenumber difference between these lines is 3.564821cm$^{-1}$. The free spectral range of the interferometer is adjusted to be equal to this wavenumber difference between ajacent lines. In order to determine the manner in which the mismatch of the light frequencies from the interferometer and the individual rotational absorption lines occur the quantity $\Omega_R = \omega_R(J+1) - \omega_R(J)$ is calculated. The quantity $\Omega_R$ may be evaluated as follows:

$\Omega_R = \omega_R(J+1) - \omega_R(J) = (3B_1-B_0)-\alpha\lambda$
$.[(J+1)^2-J^2]=(3B_1-B_0)-\alpha_e(2J+1).$ Therefore, the frequency difference between adjacent rotational absorption lines in the R-branch changes in direct proportion with the rotational quantum number $J$ and the rotation-vibration interaction constant $\alpha_e$. The halfwidth, $A$, of the Fabry-Perot transmission windows is given by the equation $$A = (1-R)/2\mu d\pi \sqrt{R}$$

where $R$ is the reflectivity of the Fabry-Perot mirrors and $\mu d$ is the optical path length between the mirrors. Assuming that the reflectivity $R \approx 0.85$, then $A = 0.185 \text{cm}^{-1}$. The frequency mismatch with the $\omega_R(J=5)$ line is $0.035 \text{cm}^{-1}$, which is well within the transmission halfwidth of the Fabry-Perot interferometer. The frequency mismatch with the $\omega_R(J=3)$ line is $0.210 \text{cm}^{-1}$, which is just slightly larger than the FPI halfwidth. The frequency mismatch with the $\omega_R(J=10)$ line is $0.210 \text{cm}^{-1}$, which is also just slightly larger than the FPI halfwidth. Therefore, the R-branch lines from $J=3$ to $J=10$ will coincide substantially with the discrete frequencies from the FPI and therefore will be most effective in the operation of the apparatus 10. The absorption line positions can be determined relative to the FPI transmission windows. From the equation for $\Omega_R$, the non-periodicity of the absorption line positions is given by the term $\alpha_e(2J+1)$. Equating this to the FPI transmission halfwidth yields.

$$A = \alpha_e(2J_R + 1)$$

$$\left(\frac{1-R}{2\mu d\pi \sqrt{R}}\right) = \alpha_e(2J_R + 1).$$

Since $(1/2\mu d) = $ free spectral range, is set to be equal to the product of the periodic contribution in the equation for $\Omega_R$, namely, $3B_1 - B_0$, and the factor $n/n'$ $$\frac{n}{n'}(3B_1 - B_0)\left(\frac{1-R}{\pi\sqrt{R}}\right) = \alpha_e(2J + 1).$$

Solving for $J_R$ $$J_R = \frac{n(3B_1 - B_0)}{2\alpha_e n'}\left(\frac{1-R}{\pi\sqrt{R}}\right) - \frac{1}{2}.$$

The equilibrium value of the rotational constant $B_e$ is given as $$B_v = B_e + \alpha_e(v + \tfrac{1}{2})$$

where $B_v$ is the rotational constant of the $v$-th vibrational state.
Hence $3B_1 - B_0 = 2B_e - 4\alpha_e$, and $$J_R = \frac{n}{n'}\left(\frac{B_e}{\alpha_e} - 2\right)\left(\frac{1-R}{\pi\sqrt{R}}\right) - \frac{1}{2}.$$

For CO, $B_e = 1.931271 \text{cm}^{-1}$ and assuming a FPI mirror reflectivity of 0.85, $$J_R = 5.6 \, n/n' - 0.5.$$

Similarly, for the P-branch $$\Omega_P = \omega_P(J+1) - \omega_P(J) = -(B_1 + B_0) - \alpha_e(2J+1)$$

and the same reasoning yields $$J_P = \frac{n}{n'}\left(\frac{B_e}{\alpha_e} - 1\right)\left(\frac{1-R}{\pi\sqrt{R}}\right) - \frac{1}{2}.$$

Since $B_e/\alpha_e \gg 1$, $J_R \approx J_P$. The values of $J_R$ and $J_P$ can be denoted by $J_{opt}$. Therefore, the optimum bandwidth of the primary filtering means 16 should be equal to approximately $2B_e J_{opt}$ and no greater than $4B_e J_{opt}$. The value of $J_{opt}$ for the principal interferograms having $n'=3$, for example, is equal to 1.4. Thus, it is always possible to match the transmission windows of the interferometer with at least two absorption lines of the species appointed for detection.

For the principle interferogram of CO with $n'=3$, the interferometer will transmit radiation through transmission windows corresponding to the frequencies of at least two of the absorption lines appointed for analysis and, in addition, through two extra tramission windows spaced at equal frequency intervals with and between the absorption lines appointed for analysis. In situations where the absorption lines of the gas being analyzed are relatively narrow and exist in a frequency region that does not contain interfering absorption lines from other gases, use of principal inteferograms of the type wherein $n'=3$ provides increased sensitivity. The increase in sensitivity is produced by the better match created between absorption linewidth and the widths of the interferometer's transmission windows. The decrease in sensitivity otherwise resulting from the presence of additional FPI transmission windows is offset by the increase in sensitivity achieved by reducing the width of the FPI transmission windows. The increase in sensitivity which is realized in a particular situation depends on the value of $n'$ selected, which, in turn, is governed by the experimental conditions associated with the gas sample under investigation. It is significantly greater than that produced by increasing the reflectivity of the FPI mirrors. The latter approach permits narrowing the width of the FPI transmission windows without introducing additional radiation not absorbed by the gas, and would, at first, appear to be a better way to improve the match between absorption linewidth and FPI transmission linewidth. In practice, however, for high mirror reflectivities the transmissivity of the FPI is decreased by small absorption and/or scattering losses in the FPI mirrored surfaces. This reduction is transmissivity will result in a decrease in sensitivity that is greater than the sensitivity loss produced by introduction of additional transmission windows discussed above. Further, the use of lower reflectivity FPI mirrors with high transmissivity will result in a device that can be used for a larger number of experimental applications.

For the secondary interferograms of CO with $n=3$, a value of 16 is obtained for the quantity $J_{opt}$. This value for $J_{opt}$ indicates that absorption of radiation transmitted by the FPI occurs over a frequency range that contains approximately 16 absorption lines. In use of a secondary interferogram having $n=3$, FPI transmissions windows occur at every third absorption line, so that absorption will take place at only five absorption lines.

The usefulness of these secondary interferograms is anticipated for the cases where gas mixtures are being analyzed. In such cases strong absorption lines from a gas other than the one appointed for analysis can interfere with the measurement of the gas appointed for analysis. This interference can be reduced or eliminated by selecting a secondary interferogram which does not provide radiation at the absorption frequencies of the interfering gas.

As previously noted, the modulating means 26 modulates the phase difference, $\phi$, so as to vary the intensity of the transmitted signal 30. In order to obtain the maximum modulated signal, the modulating range is adjusted to approximately 1/2 the frequency spacing between adjacent fringes. The modulating range can, alternatively, be restricted to preselected portions of the absorption spectrum of the preselected species in order to increase the intensity of the modulated signal. Generally speaking, the modulating range should be no greater than the frequency spacing between adjacent absorption lines of the preselected species.

The resultant signal 30 from secondary filtering means 18 and gas sample 20 is focused in the plane of pinhole stop 32 by lens 34. Lens 34 is adjusted so that the center of the signal is positioned on the pinhole 36. The intensity of the portion of signal 30 passing through the pinhole 36 is detected by an infrared detector 38. Phase sensitive detection means 28, such as a lock-in amplifier, is adapted to receive the signal from infrared detector 38 and detect the intensity variation thereof. The output of the phase sensitive detection means 28, representing the signal intensity change, is displayed by an indicating and recording means 40, which can comprise an oscilloscope and a chart recorder.

In FIG. 3, the secondary filtering means 18 and the modulating means 26 are shown in greater detail. The secondary filtering means shown is a Fabry-Perot interferometer (FPI) which is scanned by varying the phase difference, $\phi$, between interfering beams of light in a conventional way. Scanning methods such as those wherein the pressure of gas between the mirrors of the FPI is altered so as to change the optical path therebetween can also be used. Accordingly, the secondary filtering means 18 shown in FIG. 3 should be interpreted as illustrative and not in a limiting sense. Such means has cylindrical air bearings 56 and 58 which normally operate at about 30 psi and collectively support a hollow metal cylinder 60 approximately 35 cm. long and constructed of stainless steel or the like. The outer diameter of the cylinder 60 is centerless ground to about 4 cm. The inner diameter of the cylinder 60 is about 3.5 cm. Each of the air bearings 56 and 58 is about 8 cm. long and has outer and inner diameters of about 5 cm. and about 4 cm., respectively. The separation between centers of the air bearings is approximately 20 cm. One of the mirrors 62 of the secondary filtering means 18 is fixedly mounted on end 64 of cylinder 60 as by a suitable adhesive or the like. The plane surface of the mirror 62 is substantially perpendicular to the translational axis of the cylinder. The other mirror 66 is fixedly mounted to the modulating means 42 as hereinafter described. Each of the air bearings 56 and 58 rests in precise v-blocks of a base plate (not shown) treated so as to dampen external vibrations. Filtered light 17 from primary filtering means 16 enters the secondary filtering means 18 at end 68 of cylinder 60. A carriage 70 caused to move horizontally by means of a precision screw 72 and having a coupling arm 82 fixedly secured thereto by mechanical fastening means, such as screws 88, and to cylinder 60 as described hereinafter provides the cylinder 60 with the linear motion needed the scan the secondary filtering means 18. Precision screw 72 is coupled to a digital stepping motor 74 through gear assembly 76. The scan rate of the interferometer is controlled either by changing the gear ratio of assembly 76, as by means of magnetic clutches or the like, or by varying the pulse rate input to the digital stepping motor 74. With apparatus of the type described, the scan rate can be varied over a range as great as $10^6$ to 1 or more.

In order to transmit precisely the linear motion to cylinder 60, a collar 78 having glass plate 80 adhesively secured thereto, is fixedly attached to the cylinder 60. The coupling arm 82 has a ball 86 comprised of stainless steel, or the like, associated with an end 84 thereof. A permanent magnet 90 is attached to end 84 of coupling arm 82 near the ball 86. Due to the magnetic attraction between the collar 78 and the magnet 90, the ball is held in contact with the glass plate 80. A low friction contact point is thereby provided. The contact force produced at such contact point by linear movement of the carriage 70 can be adjusted either by varying the separation between the magnet 90 and the collar 78, or by decreasing the strength of the magnet 90.

A sectional view of one form of modulating means 26 is shown in FIG. 3. Other forms of the modulating means 26 can also be used. Preferably, the modulating means 26 has a hollow cylindrical body 92 of piezolectric ceramics. The inner and outer wall 94 and 96 of the cylindrical body 92 are coated with an electrically conductive material such as silver or the like.

Insulating members 98 and 100 comprised of an insulating material such as ceramic or the like are secured to the cylindrical body 92, at ends 102 and 104, respectively, by a suitable adhesive such as an epoxy resin. Mirror 66 is fixedly attached to insulating member 98 by an adhesive of the type used to secure mirror 62 to the end 64 of cylinder 60. In order that mirror 66 be maintained in parallel with mirror 62, the insulating member 100 is adhesively secured to face 106 of holding member 108. The outer face 110 of the holding member 108 has connected thereto a plurality of differential screw micrometers 112, which can be adjusted in the conventional way to provide for precise angular alignment of the mirror 66. Electrodes 114 and 116 are attached to the inner wall 94 and the outer wall 96, respectively. Voltage having a wave form such as a sine wave or a square wave impressed thereon is applied from a high voltage low current power supply 101 to the electrodes 114 and 116. Upon application of the voltage the cylindrical body 92 is caused to modulate in a linear direction, whereby the intensity of signal 30 is varied. When the voltage applied from power supply 101 to electrodes 114 and 116 has the form of a square wave, the voltage limits of the wave form can be adjusted so that the intensity of the signal 30 alternates between its maximum and minimum values. A synchronous detection means is provided for determining the difference in amplitude between the maximum and minimum values of the signal 30 for each cycle of the square wave to produce an electrical output signal proportional to the maximum and minimum values of the signal 30. As a result, the accuracy of the detecting means and hence the sensitivity of the apparatus 10 is increased by a factor in the order of about 100 or more.

The apparatus 10 which has been disclosed herein can, of course, be modified in numerous ways without departing from the scope of the invention. For example, secondary filtering means 18 can be a fixed etalon tuned by controlling the temperature thereof. One type of fixed etalon which is suitable is comprised of optically transparent material, such as potassium bromide, potassium chloride, lithium fluoride, magnesium fluoride, calcium fluoride, cesium bromide, sodium bromide, cesium iodide, barium fluoride, sodium chloride, and the like, having high transmission characteristics in the frequency region of the absorption band of the preselected species. In addition, such an etalon has opposed surfaces which are polished, flat, parallel and coated with silver, dielectric material or the like for high reflectivity at a preselected frequency region. For a preselected species such as carbon monoxide, having an absorption spectrum in the frequency region of about 2,050to 2,250 wavenumbers, preferred optically transparent material include potassium bromide, lithium fluoride and magnesium fluoride. The thickness of the solid etalon can be chosen so that the free spectral range of the etalon corresponds approximately to the frequency difference between spectral components of the given absorption spectrum. Fine tuning of the solid etalon is affected by providing means for controlling the temperature, and hence the optical path length, thereof so as to cause the transmission peaks for adjacent orders to coincide with the components of the given absorption spectrum. Lenses 14 and 34 can be replaced with off-axis parabolic mirrors (not shown) to enhance the optical through-put of the apparatus 10. As shown in FIG. 4, the signal intensity change can be determined without modulating the phase difference of the secondary filtering means 18 by transmitting a second beam of light from source 12' through conditioning means 14', primary and secondary filtering mans 16' and 18', sample 20, lens 34', pinhole 36' of pinhole stop 32' to infrared detector 38' and indicating and recording means 40'. In the latter embodiment, the secondary filtering means 18 and 18' each receive light having the same frequency range and are adjusted to transmit the light at two different sets of discrete frequencies, the first set of frequencies being shifted and the second set of frequencies by an amount no greater than the frequency spacing between adjacent absorption lines of the preselected species, and preferably about one-half of such frequency spacing. Other similar modifications can be made which fall within the scope of the present invention. It is, accordingly, intended that all matter contained in the above description and shown in the accompanying drawings be interpreted as illustrative and not in a limiting sense.

In operation, light 15, containing incoherent, infrared radiation, is collected, collimated and transmitted by light conditioning means 14 to primary filtering means 16. The primary filtering means 16 receives the light 15, selectively separates therefrom light 17 having a frequency range in the region of an absorption band for the preselected molecular species, and sends the separated light 17 to the secondary filtering means 18. The secondary filtering means 18 receives the light 17 and transmits light having a plurality of discrete frequencies which provides a detectable signal 30. The detectable signal is transmitted through gaseous material in sample 20, whereby the intensity of the signal changes in proportion to the concentration of the preselected species. A modulating means 26 operates to modulate the phase difference of the secondary filtering means so as to vary the intensity of the signal 30. The intensity variation of the signal 30 is detected by a phase sensitive detection means 28. The resultant signal from the phase sensitive detection means 28 is displayed by the indicating and recording means 40.

Having thus described the invention in rather full detail, it will be understood that these details need not be strictly adhered to but that various changes and modifications may suggest themselves to one skilled in the art, all falling within the scope of the present invention as defined by the subjoined claims.

I claim:

1. Apparatus for detecting and quantitatively measuring a molecular species of gaseous material in a sample to be analyzed, comprising:
   a. light source means for generating incoherent infrared radiation;
   b. light conditioning means for collecting, collimating and transmitting said light;
   c. primary filtering means adapted to receive said light and selectively transmit light having a frequency range in the region of an absorption band for the molecular species to be detected;
   d. secondary filtering means adapted to receive said filtered light and transmit light having a plurality of discrete frequencies forming a plurality of fringes which provide a detectable signal, said secondary filtering means having interference producing means for providing a plurality of transmission windows regularly spaced in frequency, the frequency spacing between adjacent windows being adjusted to equal substantially the product of the frequency difference between adjacent spectral lines of the absorption spectrum for the molecular species to be detected and the factor $n/n_{,}$, where $n$ and $n'$ are integers and $n$ does not equal $n'$ and scanning means for causing the transmission peaks for adjacent $n$'th orders to coincide substantially with the spectral lines of said absorption spectrum, whereby said detectable signal has an intensity substantially equal to the sum of said fringes;
   e. means for transmitting said detectable signal through said gaseous material, whereby the intensity of said detectable signal changes in proportion to the concentration of said molecular species;
   f. signal conditioning means for converting to measurable form said intensity change; and
   g. detecting means for indicating the magnitude of said intensity change.

2. Apparatus as recited in claim 1, wherein said signal conditioning means includes modulating means for modulating the phase difference between interfering rays of said light so as to shift the frequency of each fringe, the modulating range being no greater than the frequency spacing between adjacent orders, and synchronous detection means for detecting the intensity variation of the signal, whereby the magnitude of the signal intensity change can be identified.

3. Apparatus as recited in claim 2, wherein said modulating means has a modulating range of about one-half the frequency width of each fringe.

4. Apparatus as recited in claim 3, including indicating and recording means for displaying said signal.

5. Apparatus as recited in claim 3, wherein said modulating means is a piezoelectric cylinder and said synchronous detection means is a phase sensitive detection system.

6. Apparatus as recited in claim 1 wherein said secondary filtering means is a Fabry-Perot interferometer.

7. Apparatus as recited in claim 1 wherein said secondary filtering means is a solid etalon having temperature control means associated therewith for adjusting the optical path length thereof.

8. Apparatus as recited in claim 5 including means for applying to said cylinder a voltage having a square wave form, the limits of said voltage being adjusted so that the intensity of said detectable signal alternates between its maximum and minimum values, means for determining for each cycle of said voltage the difference in amplitude between said maximum and minimum values of said detectable signal to produce an electrical output signal proportional to the maximum and minimum values of the detectable signal.

9. Apparatus as recited in claim 7, wherein said solid elaton is composed of optically transparent material selected from the group consisting of potassium bromide, potassium chloride, lithium fluoride, magnesium fluoride, calcium fluoride, cesium bromide, cesium iodide, barium fluoride, sodium chloride and sodium bromide.

10. Apparatus as recited in claim 3, wherein said modulating means is a piezoelectric cylinder and said synchronous detection means is a lock-in amplifier.

11. Apparatus as recited in claim 1, wherein the frequency spacing between adjacent windows of said interference producing means is adjusted to equal substantially the product of the frequency difference between adjacent spectral lines of the absorption spectrum for the molecular species to be detected and the factor $(1/n_,)$, where $n'$ is an integer greater than one.

12. Apparatus as recited in claim 1, wherein the frequency spacing between adjacent windows of said interference producing means is adjusted to equal substantially the product of the frequency difference between adjacent spectral lines of the absorption spectrum for the molecular species to be detected and the factor $(n/n_,)$ where $n$ is an integer greater than one and $n'$ is equal to one.

13. Apparatus for detecting and quantitatively measuring a molecular species of gaseous material in a sample to be analyzed comprising:
  a. light source means for generating incoherent infrared radiation, said light source means being adapted to emit light having a frequency range in the region of an absorption band for the molecular species to be detected;
  b. light conditioning means for collecting, collimating and transmitting said light;
  c. filtering means adapted to receive said light and transmit light having a plurality of discrete frequencies forming a plurality of fringes which provide a detectable signal, said filtering means having interference producing means for providing a plurality of transmission windows regularly spaced in frequency the frequency spacing between adjacent windows being adjusted to equal substantially the product of frequency difference between adjacent spectral lines of the absorption spectrum for the molecular species to be detected and the factor $(n/n_,)$ where $n$ and $n'$ are integers and $n$ and $n$ does not equal $n'$, and scanning means for causing the transmission peaks for adjacent $n$'th orders to coincide substantially with the spectral lines of said absorption spectrum, whereby said detectable signal has an intensity substantially equal to the sum of said fringes;
  d. means for transmitting said detectable signal through said gaseous material, whereby the intensity of said detectable signal changes in proportion to the concentration of said molecular species;
  e. signal conditioning means for converting to measurable form said intensity change; and
  f. detecting means for indicating the magnitude of said intensity change.

14. Apparatus as recited in claim 13 wherein said light source means is a light emitting diode.

15. Apparatus as recited in claim 13, wherein the frequency spacing between adjacent windows of said interference producing means is adjusted to equal substantially the product of the frequency difference between adjacent spectral lines of the absorption spectrum for the molecular species to be detected and the factor $(1/n_,)$ where $n'$ is an integer greater than 1.

16. Apparatus as recited in claim 13, wherein the frequency spacing between adjacent windows of said interference producing means is adjusted to equal substantially the product of the frequency difference between adjacent spectral lines of the absorption spectrum for the molecular species to be detected and the factor $(n/n_,)$ where $n$ is an integer greater than 1 and $n'$ is equal to 1.

17. A method for detecting and quantitatively measuring a molecular species of gaseous material in a sample to be analyzed, comprising the steps of
  generating light in the form of incoherent infrared radiation;
  collecting, collimating and transmitting the light;
  filtering said light so as to selectively transmit light having a frequency range in the region of an absorption band for the molecular species to be detected;
  interferometrically filtering said filtered light and transmitting light at a plurality of discrete frequencies to form a plurality of fringes which provide a detectable signal by directing the light through a plurality of transmission windows regularly spaced in frequency, the frequency spacing between adjacent windows being equal substantially to the product of the frequency difference between adjacent spectral lines of the absorption spectrum for the molecular species to be detected and the factor $(n/n_,)$ where $n$ and $n'$ are integers and $n$ does not equal $n'$, and scanning said light to cause the transmission peaks for adjacent $n$'th orders to coincide substantially with the spectral lines of said absorption spectrum, said signal having an intensity substantially equal to the sum of said fringes;
  transmitting said detectable signal through said gaseous material, whereby the intensity of said detectable signal changes in proportion to the concentration of said molecular species; and
  detecting and indicating the intensity change of said signal.

18. A method as recited in claim 17, including the steps of modulating the phase difference between interfering rays of said light so as to vary the intensity of the signal, the modulating range being no greater than the frequency spacing between adjacent absorption lines of said molecular species.

19. A method as recited in claim 17, wherein the frequency spacing between adjacent windows is adjusted to equal substantially the product of the frequency difference between adjacent spectral lines of the absorption spectrum for the molecular species to be detected and the factor $(1/n_{\prime\prime})$ where $n'$ is an integer greater than 1.

20. A method as recited in claim 17, wherein the frequency spacing between adjacent windows is adjusted to equal substantially the product of the frequency difference between adjacent spectral lines of the absorption spectrum for the molecular species to be detected and the factor $n/n_{\prime\prime}$ where $n$ is an integer greater than one and $n'$ is equal to 1.

* * * * *